United States Patent
Cobb

(10) Patent No.: US 10,971,903 B1
(45) Date of Patent: Apr. 6, 2021

(54) UTILITY DISTRIBUTION ENCLOSURE

(71) Applicant: Alabama Power Company, Birmingham, AL (US)

(72) Inventor: Joshua A. Cobb, Wetumpka, AL (US)

(73) Assignee: Alabama Power Company, Birmingham, AL (US)

( * ) Notice: Subject to any disclaimer, the term of this patent is extended or adjusted under 35 U.S.C. 154(b) by 0 days.

(21) Appl. No.: 16/940,544

(22) Filed: Jul. 28, 2020

(51) Int. Cl.
*H02B 1/46* (2006.01)
*H02G 9/10* (2006.01)
*H02B 1/38* (2006.01)
*H02B 1/30* (2006.01)

(52) U.S. Cl.
CPC ............... *H02B 1/46* (2013.01); *H02B 1/305* (2013.01); *H02B 1/38* (2013.01); *H02G 9/10* (2013.01)

(58) Field of Classification Search
CPC . H02G 9/10; H02B 1/305; H02B 1/38; H02B 1/46
See application file for complete search history.

(56) References Cited

U.S. PATENT DOCUMENTS

| | | | | |
|---|---|---|---|---|
| 136,313 A | * | 2/1873 | Evert et al. | A47G 29/1214 232/37 |
| 524,163 A | * | 8/1894 | Coleman | B65D 83/0005 217/64 |
| 2,540,956 A | * | 2/1951 | Morrison | F25D 11/003 62/329 |
| 4,133,021 A | * | 1/1979 | King | H02B 1/50 174/38 |
| 5,743,501 A | * | 4/1998 | Rapp | E03C 1/33 248/200.1 |
| 5,749,616 A | * | 5/1998 | Steever | A62C 27/00 211/184 |
| 7,984,820 B2 | * | 7/2011 | Dancyger | A45C 13/02 220/532 |
| 10,556,725 B2 | * | 2/2020 | Breyburg | A45F 3/46 |

FOREIGN PATENT DOCUMENTS

| | | | | |
|---|---|---|---|---|
| CN | 209058219 U | * | 7/2019 | |
| FR | 2852037 A1 | * | 9/2004 | H02G 9/10 |

\* cited by examiner

*Primary Examiner* — Robert J Hoffberg
(74) *Attorney, Agent, or Firm* — Bush Intellectual Property Law; Kenneth M. Bush

(57) ABSTRACT

A utility distribution enclosure disclosed herein includes a container that defines an interior space that is interior of the container, a detent formed about inner surfaces of the container, and a partition positionably releaseably engageable with the detent to subdivide the interior space into a first subspace and a second subspace selectingly sized to accommodate a first utility interface and a second utility interface by positioning of the partition, in various aspects. The partition blocks interactions between the first utility interface and the second utility interface.

3 Claims, 7 Drawing Sheets

UTILITY DISTRIBUTION ENCLOSURE

FIELD OF THE INVENTION

This disclosure relates to utility infrastructure, and, more particularly, to utility distribution enclosures from which utilities are distributed over a localized area.

BACKGROUND OF THE INVENTION

Utility, as used herein, includes, for example, electrical power, natural gas, water, telephone, Internet, television, and the like. Pathway, as used herein, includes, for example, utility pathways for electrical power transmission, natural gas transmission, water transmission, fiberoptic communication, and wired electromagnetic signal communication such as for telephone, television, and Internet. The pathways for wired electromagnetic signal communication may communicate digital signals, analogue signals, or both digital and analogue signals.

Utilities may be supplied to the localized area such as a commercial or industrial building, apartment complex, housing development, over pathways distributed from a trunk or main pathway. The pathway(s) that supply a specific utility to the localized area are then connected to the corresponding trunk at an enclosure device with a separate enclosure device being provided for the pathways for each utility. For example, when providing fiberoptic communication pathways and electrical power pathways to the same localized area, it is important to keep the delicate fiberoptic pathways safe from fire and noise bleed from the electrical power pathways. Accordingly, the enclosure device used for connection of the fiberoptic pathways is separate from the enclosure device used for connection of the power distribution pathways. The result is an increase in design overhead as multiple enclosure devices must be designed to accommodate multiple utilities. Installation costs are increased due to the necessity of installing the multiple enclosure devices.

Accordingly, there is a need for improved utility distribution enclosures.

BRIEF SUMMARY OF THE INVENTION

These and other needs and disadvantages may be overcome by the apparatus disclosed herein. Additional improvements and advantages may be recognized by those of ordinary skill in the art upon study of the present disclosure.

A utility distribution enclosure disclosed herein includes a container that defines an interior space that is interior of the container, a detent formed about inner surfaces of the container, and a partition positionably releaseably engageable with the detent to subdivide the interior space into a first subspace and a second subspace selectingly sized to accommodate a first utility interface and a second utility interface by positioning of the partition, in various aspects. The partition blocks interactions between the first utility interface and the second utility interface.

This summary is presented to provide a basic understanding of some aspects of the apparatus and methods disclosed herein as a prelude to the detailed description that follows below. Accordingly, this summary is not intended to identify key elements of the apparatus and methods disclosed herein or to delineate the scope thereof.

Figure 1:
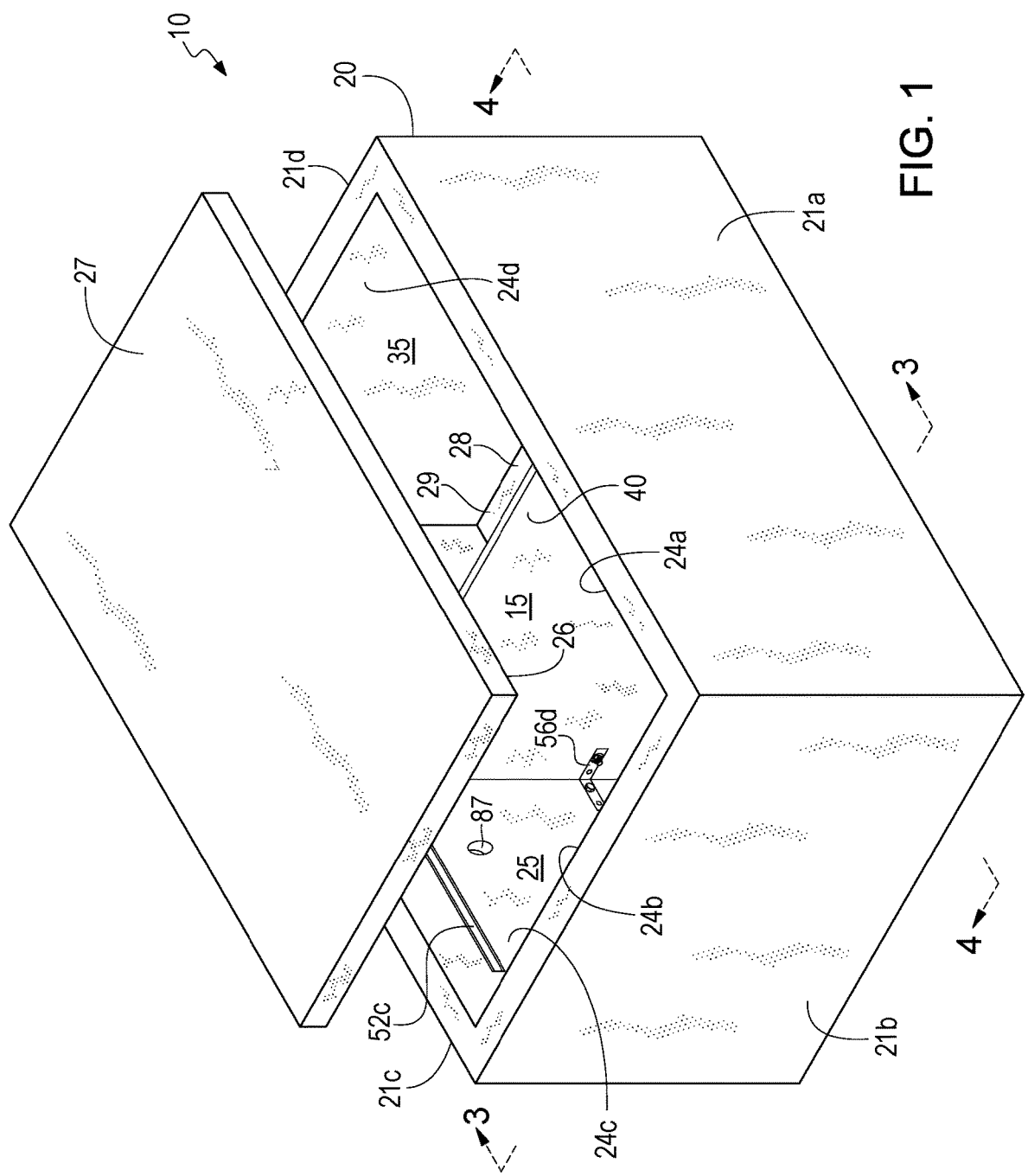
FIG. 1 illustrates by perspective view an exemplary implementation of a utility distribution enclosure.

The Figures are exemplary only, and the implementations illustrated therein are selected to facilitate explanation. The number, position, relationship and dimensions of the elements shown in the Figures to form the various implementations described herein, as well as dimensions and dimensional proportions to conform to specific force, weight, strength, flow and similar requirements are explained herein or are understandable to a person of ordinary skill in the art upon study of this disclosure. Where used in the various Figures, the same numerals designate the same or similar elements. Furthermore, when the terms "top," "bottom," "right," "left," "forward," "rear," "first," "second," "inside," "outside," and similar terms are used, the terms should be understood in reference to the orientation of the implementations shown in the drawings and are utilized to facilitate description thereof. Use herein of relative terms such as generally, about, approximately, essentially, may be indicative of engineering, manufacturing, or scientific tolerances such as ±0.1%, ±1%, ±2.5%, ±5%, or other such tolerances, as would be recognized by those of ordinary skill in the art upon study of this disclosure.

DETAILED DESCRIPTION OF THE INVENTION

A utility distribution enclosure disclosed herein includes a container and a partition positionably releaseably engageable with a detent to subdivide an interior space of the container into a first subspace and a second subspace, in various aspects. The partition may be positioned to size the first subspace and the second subspace to accommodate a first utility interface and a second utility interface, respectively. The partition blocks interactions between the first utility interface and the second utility interface.

Subdividing the interior space into the first interior space and the second interior space may allow the utility distribution enclosure to be used for multiple and differing types of utility interfaces such as a fiber optic interface and an electrical power interface. The partition, for example, may keep the fiber optic interface safe from electrical arcs, fires, and noise bleed from the electrical power interface. The partition may be positioned to size the first subspace and the second subspace to accommodate the first utility interface and the second utility interface as well as providing room for splices and fiber loops. The partition may be removed to allow use of the entire container, if necessary. When the partition is removed, the container may act as a pull box for UCD/URD cables. The utility distribution enclosure may allow for future expansion with very little disturbance of surrounding structures such as sidewalks and roads. The utility distribution enclosure may simplify design and installation of utility distribution systems.

Figure 2:
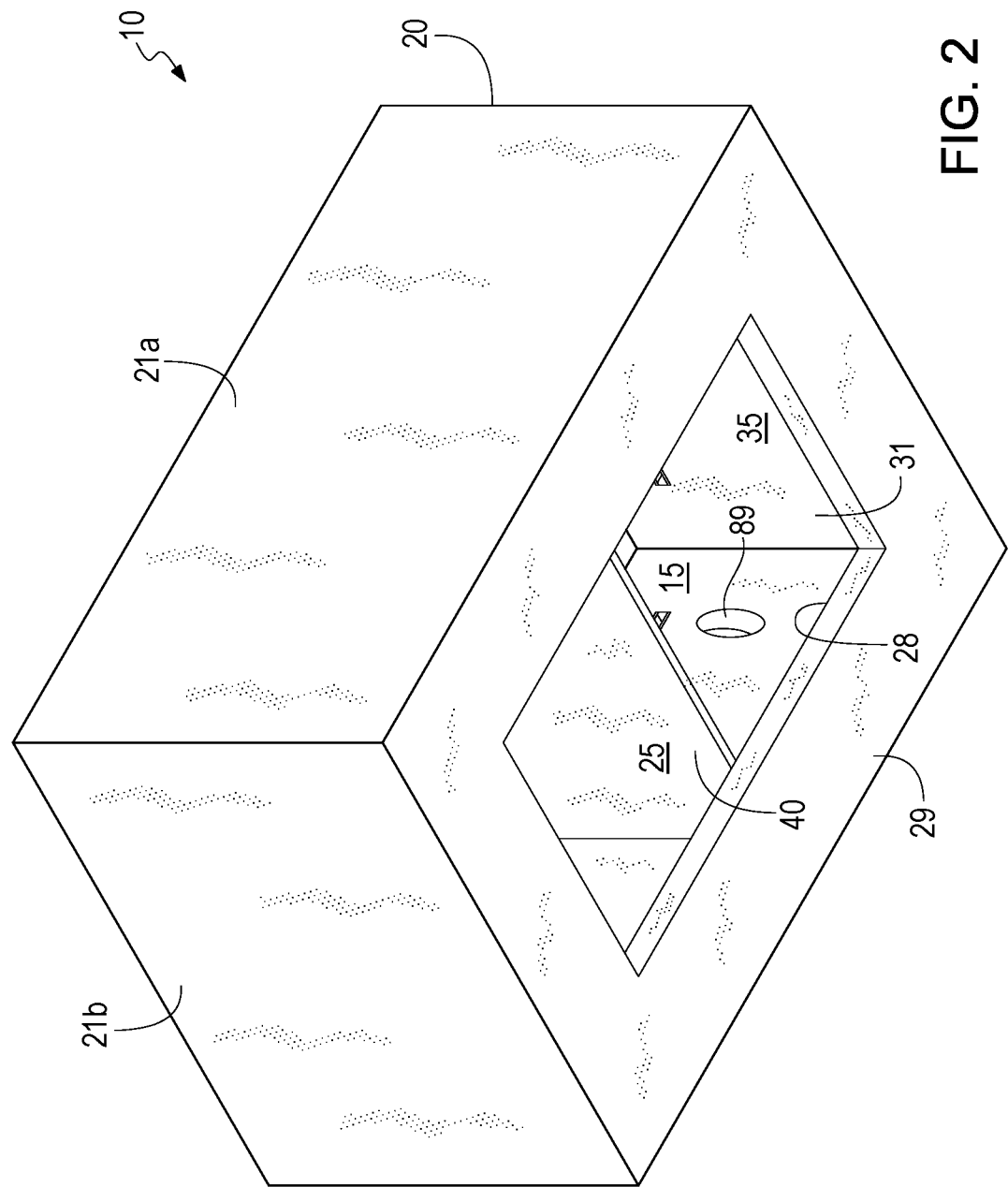
FIG. 2 illustrates by another perspective view the exemplary implementation of a utility distribution enclosure of FIG. 1.

FIG. 1 illustrates exemplary utility distribution enclosure 10 including container 20 formed as a rectangular structure with sides 21a, 21b, 21c, 21d, base 29, and cover 27. Inner surfaces 24a, 24b, 24c, 24d of sides 21a, 21b, 21c, 21d, respectively, in combination with cover inner surface 26 of cover 27 and base inner surface 28 of base 29 define interior space 15 interior of container 20, as illustrated. As illustrated in FIG. 2, base 29 of utility distribution enclosure 10 preferably includes aperture 31. Aperture 31 allows communication with interior space 15 including first subspace 25 and second subspace 35 through base 29. Partition 40 is positionably engaged with inner surfaces 24a, 24c of sides 21a, 21c within interior space 15 by detent 44 (see FIGS. 3, 4, 5) to subdivide interior space 15 into first subspace 25 and second subspace 35, as illustrated.

Sides 21a, 21b, 21c, 21d and base 29 may form a unitary structure composed of, for example, concrete, fiberglass, polymer such as high-density polyethylene (HDPE) and polyvinyl chloride (PVC), and combinations thereof. Sides 21a, 21b, 21c, 21d in unitary combination with base 29 may be formed by casting or molding, in various implementations. Partition 40 may be formed, for example, of concrete, steel, fiberglass, various fire-resistant material, electromagnetic shielding material, thermally nonconductive material, electrically nonconductive material, plastic such as HDPE, PVC, and combinations thereof. Note that container 20 and partition 40 may include various reinforcements such as steel mesh and reinforcing bars. Container 20 may be, for example, rectangular or square, in various implementations. For example, container 20 may be rectangular with dimensions 4 ft×6 ft with a depth (vertical dimension) of 3 ft.

Cover 27 is detachably engageable to sides 21a, 21b, 21c, 21d opposite base 29 to enclose interior space 15, and, thus, enclose first subspace 25 and second subspace 35, as illustrated in FIG. 1. Cover 27 and sides 21a, 21b, 21c, 21d may be configured in various ways and various seals, gaskets, and so forth may be provided so that cover 27 sealingly encloses interior space 15 when cover 27 is engaged with sides 21a, 21b, 21c, 21d, as would be readily recognized by those of ordinary skill in the art upon study of this disclosure. Cover 27 may be in locked engagement with container 20 to prevent intrusion into interior space 15, in certain implementations. With cover 27 removed from securement with sides 21a, 21b, 21c, 21d, interior space 15 including first subspace 25 and second subspace 35 may be accessible. Cover 27 may include various grippable surfaces and/or grippable member(s) that facilitate engagement of cover 27 with sides 21a, 21b, 21c, 21d in order to enclose interior space 15 or that facilitate removal of cover 27 from engagement with sides 21a, 21b, 21c, 21d for access to interior space 15. Cover 27 may be formed, for example, of steel, cast iron, fiberglass, various plastics, and combinations thereof, and the cover 27 may be structured to accommodate pedestrian traffic, vehicular traffic, and other such loads and impacts. Container 20, cover 27, and partition 40 may variously include metal mesh or sheeting to form, for example, a Faraday cage about interior space 15. Although cover 27 is illustrated as detachable from container 20, in utility enclosure 10, cover 127a, 127b is hingedly connected to container 120 and thus hingedly rotated between enclosing interior space 115 and exposing interior space 115 to allow access to interior space 115, as in utility enclosure 100 illustrated in FIG. 7.

Figure 3:
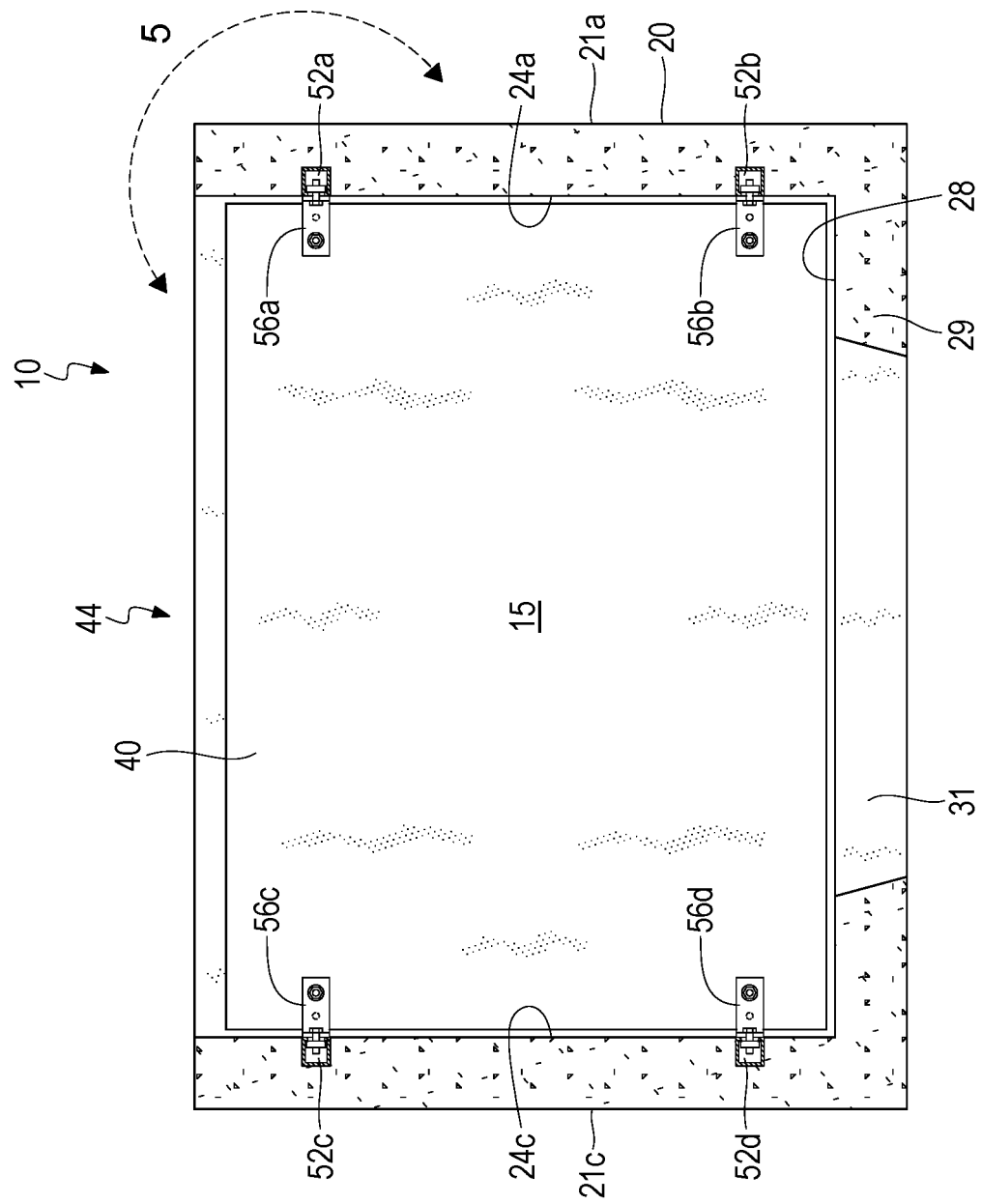
FIG. 3 illustrates by cross-sectional elevation view the exemplary implementation of a utility distribution enclosure of FIG. 1.
Figure 4:
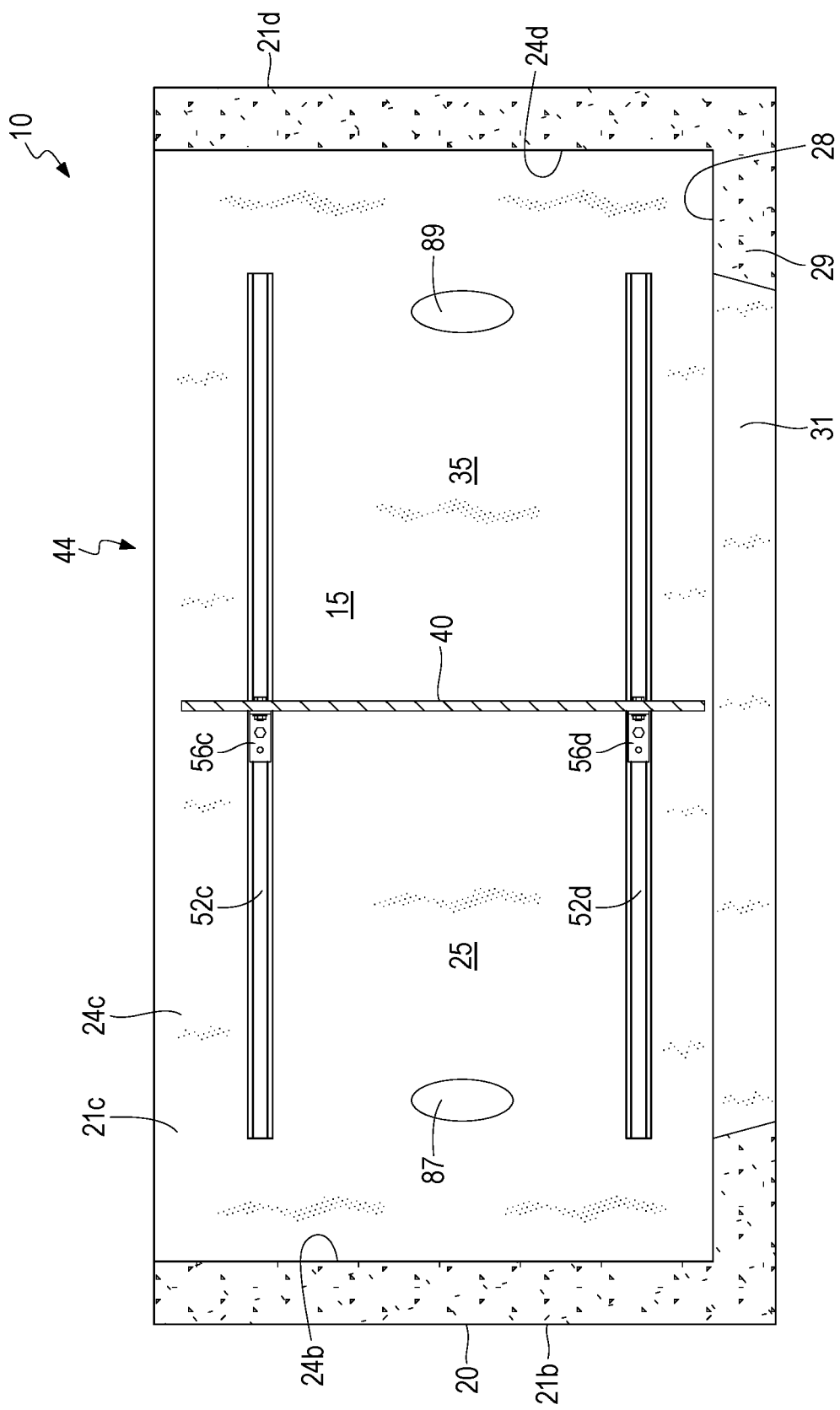
FIG. 4 illustrates by another cross-sectional elevation view the exemplary implementation of a utility distribution enclosure of FIG. 1.

As illustrated in FIGS. 3 and 4, detent 44 includes fasteners 56a, 56b, 56c, 56d attached to partition 40 and slidably releaseably securably received slots 52a, 52b, 52c, 52d to positionably secure partition 40 to sides 21a, 21c of container 20. Slots 52a, 52b are formed in inner surface 24a of side 21a, and slots 52c, 52d are formed in inner surface 24c of side 21c. Sides 21a, 21b are opposite one another and in parallel, as illustrated. Slots 52a, 52b are parallel with slots 52c, 52d, respectively, and slots 52a, 52b, 52c, 52d are perpendicular to sides 21b, 21d, as illustrated. Partition 40 is engaged with side 21a of container 20 by fasteners 56a, 56b slidably releaseably securably received in slots 52a, 52b, respectively, as illustrated in FIG. 3. Partition 40 is engaged with side 21c of container 20 by fasteners 56c, 56d slidably releaseably securably received in slots 52c, 52d, respectively, as illustrated in FIG. 3. Note that slots, such as slots 52a, 52b, 52c, 52d, may be formed in sides 21b, 21d, in other implementations. Ports 87, 89 are formed in side 21c to provide a pathway through side 21c, as illustrated in FIG. 4. Any number of ports, such as ports 87, 89, may be provided about various combinations of sides 21a, 21b, 21c, 21d, in various other implementations.

Figure 5:
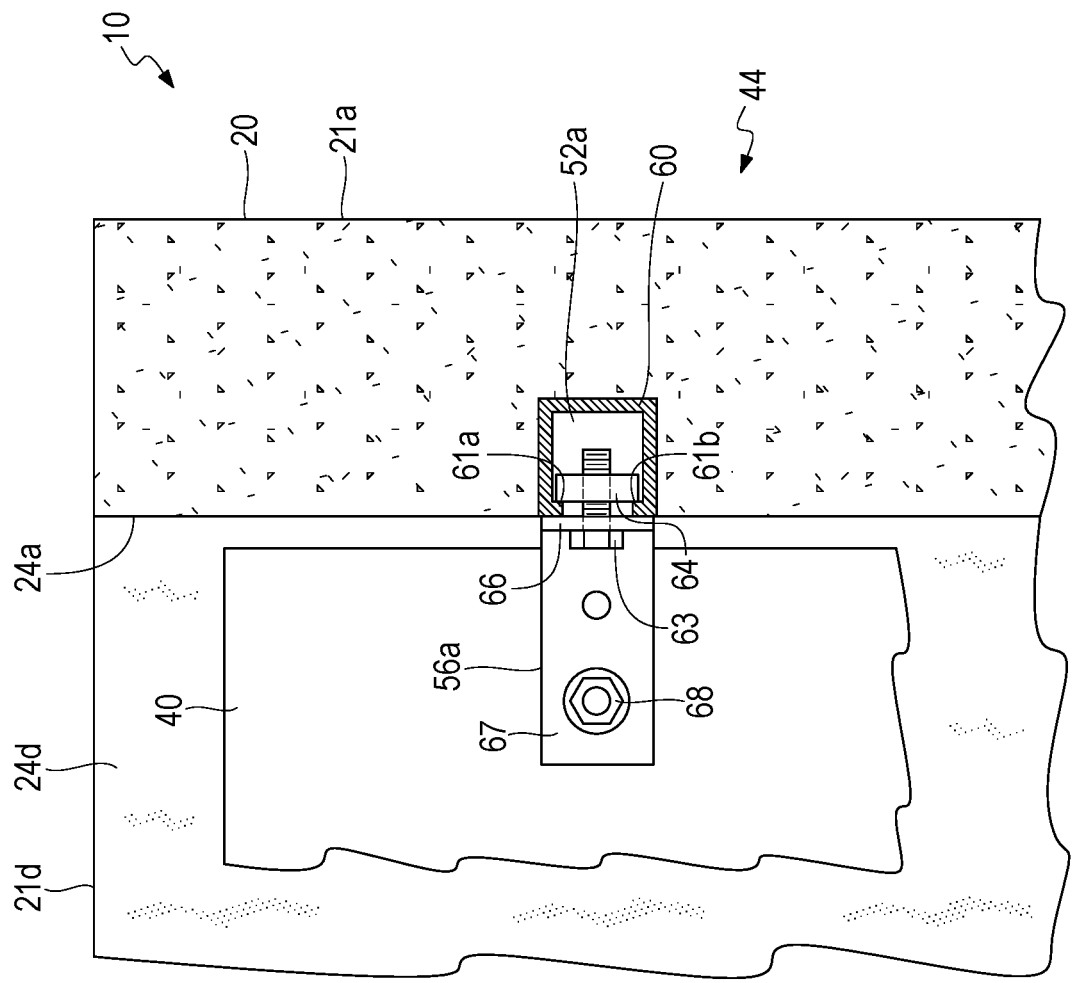
FIG. 5 illustrates by a cross-sectional elevation view a detail of the exemplary implementation of a utility distribution enclosure of FIG. 1.

Fasteners 56b, 56c, 56d and corresponding slots 52b, 52c, 52d are similar in form and function to fastener 56a received by slot 52a illustrated in FIG. 5. As illustrated in FIG. 5, slot 52a is formed by channel 60 embedded securely in inner surface 24a of side 21a. Channel 60 defines slot 52a having a rectangular cross-section with shoulders 61a, 61b forming a narrowing proximate inner surface 24a. Channel 60 may be formed, for example, of steel. Fastener 56a is generally L-shaped with base member 66 and ascendant member 67 set at a right angle to base member 66. Partition fastener 68 secures ascendant member 67 of fastener 56a to partition 40, and partition fastener 68 may be, for example, one or more bolt(s), rivet(s), screw(s), and suchlike. Bolt 63 passes through base member 66 of fastener 56a and threadedly engages nut 64 disposed within slot 52a to draw nut 64 into biased engagement with shoulders 61a, 61b thereby securing fastener 56a with channel 60 accordingly engaging partition 40 with slot 52a and, thus, side 21a. Bolt 63 may be turned to release the engagement of nut 64 with shoulders 61a, 61b, so that nut 64 may be slid within channel 60 of slot 52a, to position fastener 56a and, thus, partition 40 at any location along slot 52a as may be selected. Thus, fastener 56a may be secured with slot 52a or slidably positioned along slot 52a by drawing nut 64 into biased engagement with shoulders 61a, 61b of channel 60 or releasing nut 64 from biased engagement with shoulders 61a, 61b, respectively, by turning bolt 63 that is threadedly engaged with nut 64. Nut 64 may be released from bolt 63 to release fastener 56a entirely from slot 52a.

Figure 6:
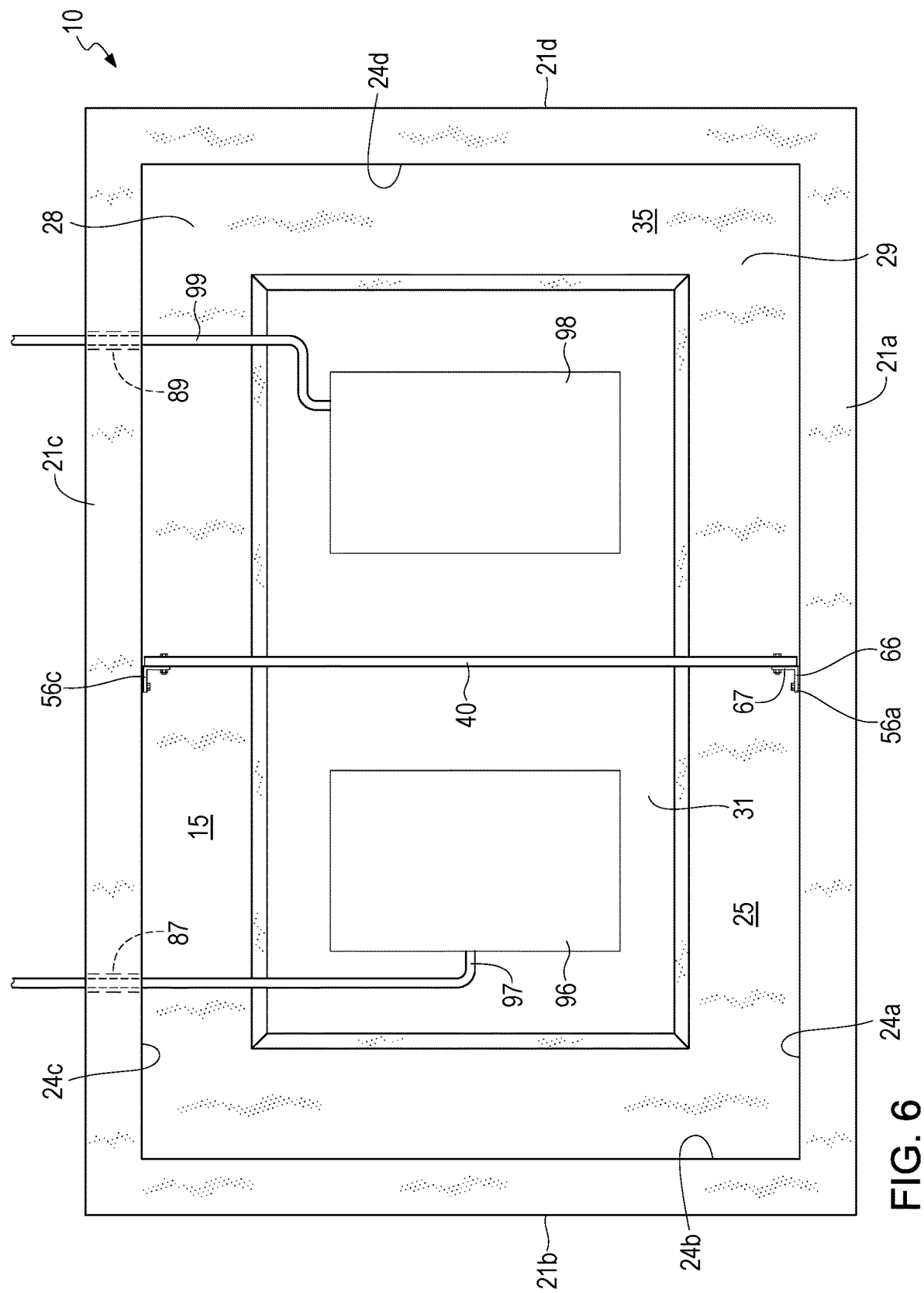
FIG. 6 illustrates by plan view the exemplary implementation of a utility distribution enclosure of FIG. 1; and, FIG. 7 illustrates by perspective view a second exemplary implementation of a utility distribution enclosure.

FIG. 6 illustrates first utility interface 96 disposed in first subspace 25 and second utility interface 98 disposed in second subspace 35, with first subspace 25 separated from second subspace 35 by partition 40. First utility interfaces 96 and second utility interface 98 may be, for example, interfaces for fiberoptic communication, underground commercial distribution (UCD) of electrical power, underground residential distribution (UCR) of electrical power, electromagnetic communication over electrical pathway(s) (e.g. cable, telephone). First utility interfaces 96 and second utility interface 98 intrude into first subspace 25 and into second subspace 35, respectively, through aperture 31 in base 29, as illustrated. Cables 97, 99 communicate with first utility interfaces 96 and second utility interface 98 through ports 87, 89, respectively, in side 21c of container 20, and cables 97, 99 may include any number of pathways that may communicate to, from, or both to and from first utility interface 96 and second utility interface 98, respectively.

Additional cables (not shown) may be provided for communication with first utility interface 96 and with second utility interface 98 beneath base 29 and additional cables, such as cables 97, 99, for communication with first utility interface 96 and/or with second utility interface 98 may pass through additional ports, such as ports, 87, 89, formed variously in one or more of sides 21a, 21b, 21c, 21d, in various implementations. Cables 97, 99 may be deployed within conduits (not shown) and the conduits may be shielded.

Partition 40, as illustrated in FIG. 6, blocks interactions between first utility interface 96 and second utility interface 98 that may impact the operation of first utility interface 96, second utility interface 98, or both first utility interface 96 and second utility interface 98. For example, partition 40 may block arcing or combustion at first utility interface 96 from interfering with operations of second utility interface 98. As another example, partition 40 may block electromagnetic interference or noise bleed between first utility interface 96 and second utility interface 98. As a third example, partition 40 may block thermal impacts between first utility interface 96 and second utility interface 98. The materials that form partition 40 may be selected to block interactions between first utility interface 96 and second utility interface 98.

In exemplary utility distribution enclosure 10, interior space 15 is subdivided into first subspace 25 and second subspace 35 by partition 40 with first utility interface 96 accommodated by first subspace 25 and second utility interface 98 accommodated by second subspace 35. It should be recognized that other implementations of a utility distribution enclosure may include two or more partitions, such as partition 40, that subdivide an interior space, such as space 15, into three or more subspaces, such as first subspace 25 and second subspace 35, to accommodate three or more utility interfaces, such as first utility interface 96 and second utility interface 98, with each utility interface within a corresponding subspace.

Figure 7:
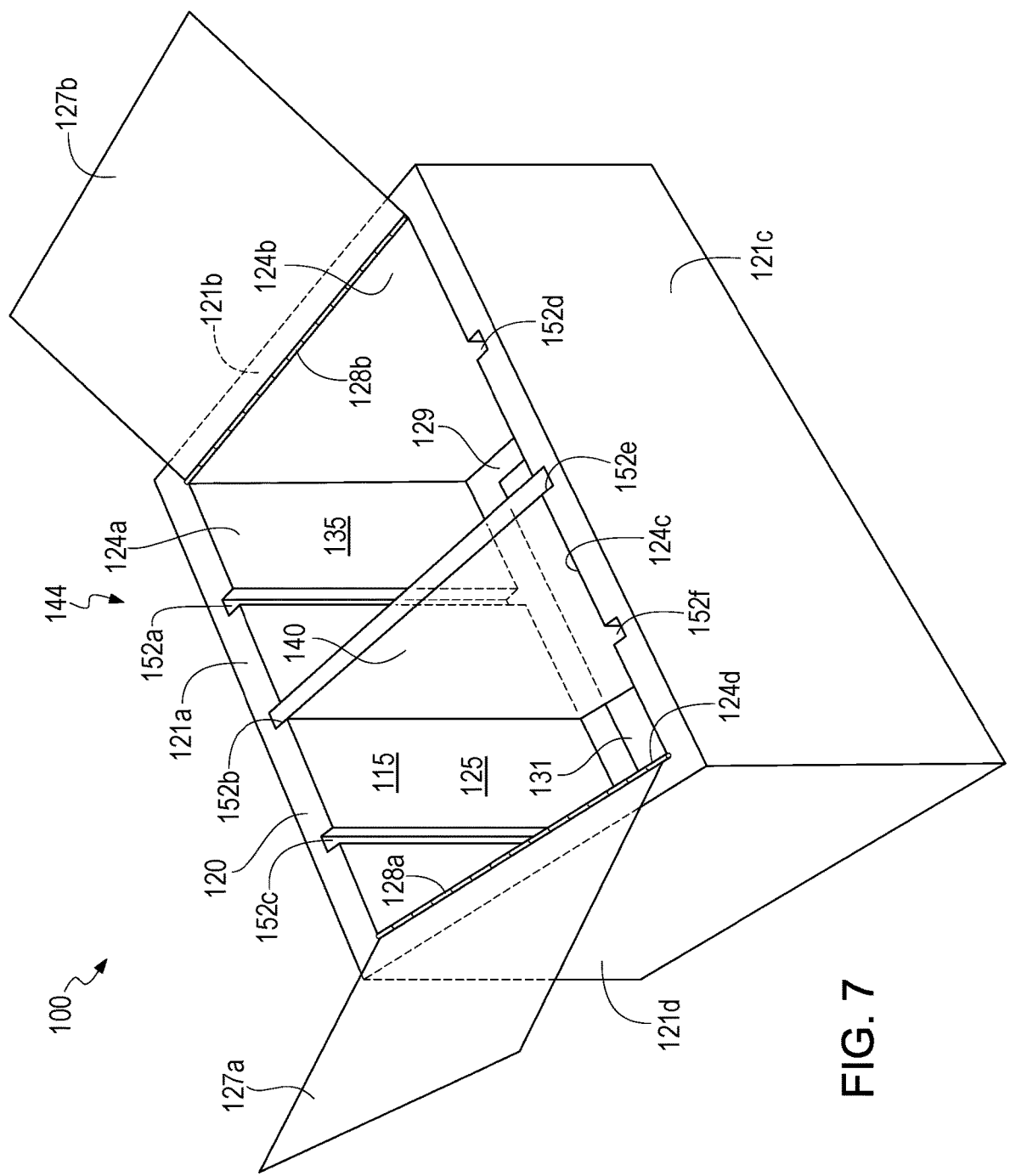

FIG. 7 illustrates exemplary utility distribution enclosure 100 including container 120 formed as a rectangular structure with sides 121a, 121b, 121c, 121d, base 129, and covers 127a, 127b hingedly attached to container 120 by hinges 128a, 128b, respectively. Sides 121a, 121b, 121c, 121d define inner surfaces 124a, 124b, 124c, 124d, respectively, as illustrated, thereby defining interior space 115. As illustrated in FIG. 7, base 129 of utility distribution enclosure 100 includes aperture 131 that allows communication with interior space 115 including first subspace 125 and second subspace 135 through base 129. A first utility interface, such as first utility interface 96, may extend through aperture 131 into first subspace 125, and a second utility interface, such as second utility interface 98, may extend through aperture 131 into second subspace 135, as illustrated. Covers 127a, 127b are illustrated in an open position that allows access to interior space 115. Covers 127a, 127b may be hingedly positioned about hinges 128a, 128b between the illustrated open position and a closed position in which covers 127a, 127b enclose interior space 115 including first subspace 125 and second subspace 135.

Detent 144 includes vertical slots 152a, 152b, 152c with a vertical orientation formed in inner surface 124a with corresponding vertical slots 152d, 152e, 152f formed in inner surface 124c that is opposite inner surface 124a. As illustrated, partition 140 is slidably insertably received in vertical slots 152b, 152e of detent 144 to subdivide interior space 115 into first subspace 125 and second subspace 135. Any of vertical slots 152a, 152b, 152c and corresponding vertical slots, 152d, 152e, 152f, respectively, of detent 144 may be selected for insertion of partition 140 therein to thereby size first subspace 125 and second subspace 135. Of course, vertical slots 152a, 152b, 152c and vertical slots, 152d, 152e, 152f are exemplary and any number of vertical slots, such as vertical slots 152a, 152b, 152c, 152d, 152e, 152f, may be formed in sides 121a, 121c with various spatial distributions, in various implementations. Vertical slots, such as vertical slots 152a, 152b, 152c, 152d, 152e, 152f, may be formed in sides 121b, 121d, in other implementations.

In operation, a container, such as container 20, 120, of a utility distribution enclosure, such as utility distribution enclosure 10, 100, is emplaced over a first utility interface and a second utility interface, such as first utility interfaces 96 and second utility interface 98, so that the first utility interface and the second utility interface extend through an aperture, such as aperture 31, 131 formed in a base, such as base 29, 129, of the container into an interior space, such as interior space 15, 115, defined by the container. Then, a partition, such as partition 40, 140, is positioned vertically within the interior space to subdivide the interior space into a first subspace, such as first subspace 25, 125, and a second subspace, such as second subspace 35, 135. The position of the partition may be selected such that the partition separates the first utility interface from the second utility interface and to accommodate the first utility interface within the first subspace and to accommodate the second utility interface within the second subspace. When the partition is positioned within the interior space as selected, the partition is secured to opposing inner surfaces, such as inner surfaces 24a, 24c, 124a, 124c, of the container by a detent, such as detent 44, 144.

In some implementations, the detent includes fasteners, such as fastener 56a, 56b, 56c, 56d, attached to the partition and received in corresponding slots, such as slots 52a, 52b, 52c, 52d. In such implementations, the partition may be secured by engagement of the fasteners with the corresponding slots. The fasteners may be slidably releaseably securably received in the slots. When the fasteners are releasable received in the slots, the fasteners may be slid in the slots to allow positioning of the partition within the interior space as may be selected to accommodate the first utility interface and the second utility interface within the first subspace and within the second subspace, respectively. When the partition is positioned as selected, the fasteners may then be engaged with the slots to secure the partition at the selected position.

In other implementations, the detent includes vertical slots, such as vertical slots 152a, 152b, 152c, 152d, 152e, 152f, formed in opposing inner surfaces of the container. The partition may then be inserted into opposing vertical slots of the detent selected to divide the interior space into a first subspace and a second subspace that accommodates the first utility interface and the second utility interface, respectively, including cables, such as cables 97, 99, in communication with the first utility interface, the second utility interface, or both the first utility interface and the second utility interface.

Cables, such as cables 97, 99, may be passed through ports, such as ports 87, 89, formed in one or more sides of the container. A cover, such as cover 27, 127a, 127b, may be positioned over the container to enclose the interior space including the first subspace and the second subspace. The cover may, for example, be removed or hingedly positioned to expose the interior space including the first subspace and the second subspace to allow access to the first utility interface and the second utility interface. The container including the first utility interface and the second utility interface may be placed generally below grade, and accordingly the cover may be located at grade. The aperture in the base may allow drainage of water such as rainwater from the container, and the container may overlay a fill such as gravel or crushed rock that facilitates drainage of water from the container. The utility interfaces may be disposed below grade to extend through the aperture into the interior space when the container is placed below grade with the cover located at grade. Various communication pathways may communicate with the utility interfaces below the base of the container.

The partition may be repositioned as may be required to accommodate the first utility interface and the second utility interface including cables in communication therewith should that become necessary. Additional partitions may be positioned within the interior space to form additional subspaces in order to accommodate additional utility interfaces as may be required. The utility enclosure may accommodate future additional utility interfaces by positioning of additional partitions.

The foregoing discussion along with the Figures discloses and describes various exemplary implementations. These implementations are not meant to limit the scope of coverage, but, instead, to assist in understanding the context of the language used in this specification and in the claims. The Abstract is presented to meet requirements of 37 C.F.R. § 1.72(b) only. Accordingly, the Abstract is not intended to identify key elements of the apparatus and methods disclosed herein or to delineate the scope thereof. Upon study of this disclosure and the exemplary implementations herein, one of ordinary skill in the art may readily recognize that various changes, modifications and variations can be made thereto without departing from the spirit and scope of the inventions as defined in the following claims.

The invention claimed is:

1. A utility distribution enclosure apparatus, comprising:
 a container that defines an interior space, the interior space subdivided into a first subspace to accommodate a first utility interface and a second subspace to accommodate a second utility interface, the container including at least one opening formed through a side or a bottom of the container to provide a pathway for a first cable configured to be coupled to the first utility interface within the first subspace and a second cable configured to be coupled to the second utility interface within the second subspace;
 a removable cover that encloses the interior space of the container when the cover is engaged with the container;
 a partition positionably releaseably with the container to subdivide the interior space into the first subspace selectingly sized by positioning of the partition to accommodate the first utility interface and the second subspace selectingly sized by positioning of the partition to accommodate the second utility interface, wherein the partition blocks interactions between the first and second utility interfaces; and
 a detent formed about inner surfaces of the container and releasably engageable with the partition, the detent comprising:
  a first slot formed on a first inner surface of the inner surfaces on a first side of the container;
  a second slot formed on a second inner surface of the inner surfaces on a second side of the container, the first slot and the second slot being opposing and parallel to one another;
  a first fastener attached to the partition and slidably received in the first slot, the first fastener releaseably engageable with the first slot to secure the partition to the first slot at a location selected along the first slot; and
  a second fastener attached to the partition and slidably received in the second slot, the second fastener releaseably engageable with the second slot to secure the partition to the second slot at a location selected along the second slot;
  wherein each of the first and second fasteners includes a bolt that that passes through a respective one of the first and second fasteners and threadedly engages a nut disposed within a respective one of the first and second slots to draw the nut into biased engagement with the respective one of the first and second slots thereby securing each of the first and second fasteners to the container.

2. The apparatus of claim 1, wherein the interactions that the partition blocks are selected from a group consisting of thermal effects, electromagnetic effects, arcing, and combustion.

3. The apparatus of claim 1, wherein the first utility interface is selected from a group consisting of an interface for fiberoptic communication, an interface for underground commercial distribution (UCD) of electrical power, an interface for underground residential distribution (UCR) of electrical power, and an interface for electromagnetic communication over an electrical pathway.

* * * * *